United States Patent [19]

Mader

[11] Patent Number: 5,452,363
[45] Date of Patent: Sep. 19, 1995

[54] DIRECTION SENSING MICROPHONE SYSTEM USING TIME DIFFERENTIAL

[76] Inventor: Lynn J. Mader, 8400 106th Street SE., Bismarck, N. Dak. 58504

[21] Appl. No.: 134,647

[22] Filed: Oct. 12, 1993

[51] Int. Cl.$^6$ .............................................. G01S 3/80
[52] U.S. Cl. ...................................................... 381/92
[58] Field of Search ............................ 381/92; 367/129

[56] References Cited

U.S. PATENT DOCUMENTS

| | | | |
|---|---|---|---|
| 4,212,085 | 7/1980 | Vaillancour et al. | 367/124 |
| 4,559,642 | 12/1985 | Miyaji et al. | 381/92 |
| 4,703,506 | 10/1987 | Sakamoto et al. | 381/92 |
| 4,742,548 | 5/1988 | Sessler et al. | 381/92 |
| 5,058,170 | 10/1991 | Kanamori et al. | 381/92 |
| 5,243,660 | 9/1993 | Zagorski | 381/92 |

FOREIGN PATENT DOCUMENTS 60-103900  6/1985  Japan ...................................... 381/92

*Primary Examiner*—Stephen Brinich
*Attorney, Agent, or Firm*—Jacobson and Johnson

[57] ABSTRACT

Sound received by a microphone is allowed to travel to the output, such as loudspeakers, only if the sound is coming from a desired direction. A pair of conventional microphone elements are spaced-apart within the microphone and the time it takes for the sound to pass between the two elements is measured and if within a prescribed time, then the microphone is "turned on" so that sound is permitted to reach or be gated to the output. Preferably the desired or acceptable source of the sound is from generally directly in front of the microphone, i.e., where the user of the microphone usually is located so that sound coming in from either side of the user or ambient room noise is blocked from being transferred to the output.

2 Claims, 2 Drawing Sheets

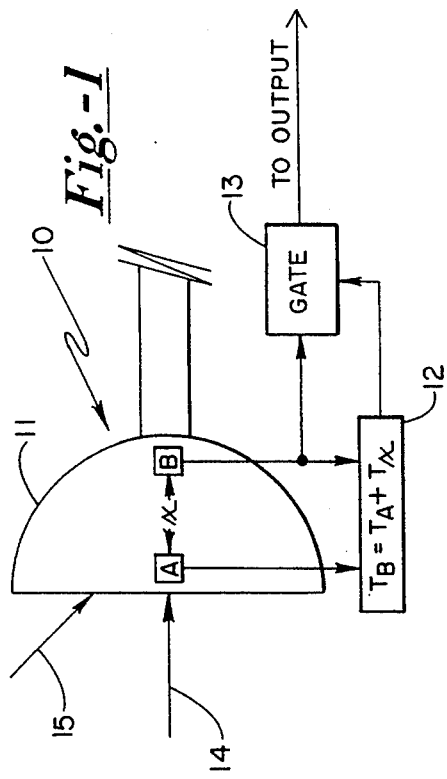

DIRECTION SENSING MICROPHONE SYSTEM USING TIME DIFFERENTIAL

BACKGROUND OF THE INVENTION

The invention is intended for use in multiple microphone systems such as utilized in conference rooms. Specifically, the invention is directed toward "turning on" a microphone or allowing the sound received from the microphone to pass to the system output, such as a loudspeaker, only when the user of that microphone is talking. Ambient noise and sounds from others in the room do not turn on the microphone. Still more specifically, the method and apparatus which is utilized to achieve the end result, is one in which the time it takes for sound to travel a predetermined distance within the microphone is used to determine the direction from which the sound came. If the measured time is not within a prescribed period, then it means that the sound is coming from a direction other than the location of a desired or acceptable source and therefore the microphone is turned off, i.e., the sound is blocked from appearing at the output of the sound system.

DESCRIPTION OF THE PRIOR ART

In multiple microphone sound systems, such as are used in conference rooms, even when the user is not speaking into the microphone the microphone will still pick up the voices of others in the room and ambient room noises. Of course there is also the potential problem of feedback causing whistling in the output loudspeakers as a result of sound from the output loudspeakers reaching the microphones.

One solution is to have an operator monitoring the activity in the conference room and selectively turning on only one microphone at a time at the request of the individual users. This has not been satisfactory. One reason is that if the user's microphone is turned on, and yet the user is not talking into the microphone, the microphone will pick up and the loudspeaker will produce the sound of any room noise or the voices of others in the room. For example, the user of the microphone may be pausing and talking to someone alongside and not intending that the conversation should be broadcast and yet parts of it might be picked up by the microphone and broadcast by the output loudspeakers. Another solution appears in U.S. Pat. No. 4,489,442 by Anderson, et al. This system utilizes directional microphone elements mounted back-to-back for monitoring the sound coming from a predetermined area. If the sound coming into the microphone is not coming from an authorized or desired direction as sensed by these directional microphone elements, then the microphone is "turned Off", i.e., the sound is prevented from being transmitted or carried to the output loudspeakers. This system requires unidirectional elements and also a fairly sophisticated system for measuring the amplitude of the sound received and making a determination of whether or not the amplitude is such that the sound is coming from a desired direction indicative of an acceptable or desired source.

SUMMARY OF THE INVENTION

The present invention utilizes two conventional microphone elements which may be nondirectional (multi-directional) or directional, which are located displaced from one another within the body of the microphone. Preferably the two elements are located along the general center of the microphone. The time that it takes for sound to travel from one of the elements to the other is measured to give an indication of the direction of the source of the sound that is received by the microphone. Only if the measured time is within a prescribed time indicating that the sound source is coming from a desired or acceptable source will the microphone be "turned on" so that the sound received by the microphone will be passed on to the output loudspeakers for broadcast. In the preferred embodiment the two microphone elements are placed along the center line of the microphone, one behind the other, with respect to the front of the microphone. In a conventional fashion, sound received by the most forward or first microphone element is converted into an electrical signal which is used to initiate a timer. The timer produces an output signal at a predetermined delayed interval. The sound which is received at the rearward or second microphone element is also conventionally converted to an electrical signal which is compared to the output of the timer. If the signal from the second element occurs at the time of the timer output signal, then the microphone is turned on by allowing the sound received at the microphone to be gated out to the output loudspeakers. If the timing relationship is such that the second microphone element should receive the sound too soon (or too late) with respect to when it is received by the first microphone element, then the sound is not coming from the desired direction, usually directly in front of the microphone, and therefore the two signals are not coincidental in time so that the microphone is not turned on and the sound received at the microphone is prevented from being passed on to the output loudspeakers. In this fashion, then, only when the user of the microphone talks into the microphone from generally right in front of the microphone will the user's voice or sound received by the microphone appear at the output loudspeaker. If the microphone user is not talking directly into the microphone and is off to the side or if there is noise or talk from others in the room that is picked up by a microphone, it will not meet the criteria as explained above and therefore the microphone will not turn on and the sound will not appear at the loudspeakers.

DESCRIPTION OF THE DRAWINGS

FIG. 1 is a diagrammatic illustration of the preferred embodiment of the present invention;

FIG. 2 illustrates a preferred embodiment of the invention showing the circuitry in block diagram form.

DESCRIPTION OF THE PREFERRED EMBODIMENT

Figure 3A:
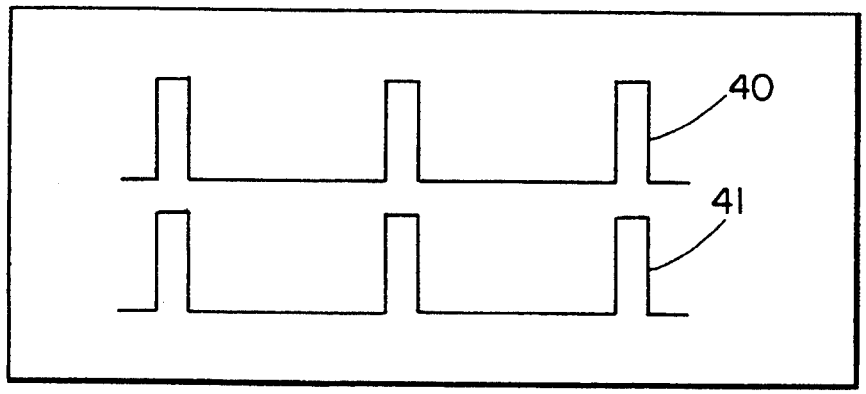
FIGS. 3A–3B show the set of pulses illustrating the timing relationships of the signals.

A conventional microphone generally designated by reference numeral 10, has a conventional outer housing 11 suitably mounted on a support stand, not shown, which in turn generally rests on a supporting surface such as a table top. Within housing 11 a pair of microphone elements identified respectively as A and B are mounted in some conventional fashion. The microphone elements are conventional and basically are transducers which change the audio or sound received at the microphone into suitable electrical analog signals representative of the audio received at the microphone.

In the preferred form, element B is mounted rearward from element A (or rightward as observed in FIG. 1 ) within microphone housing 11 and both elements are mounted at about the general center line or central axis of the microphone housing. In brief explanation of the invention, as illustrated in FIG. 1, the electrical signal outputs of elements A and B are compared timewise at 12. If the time it takes for the sound to reach element B, (Tb) equals the time it takes for the sound to reach element A, (Ta), plus the time it takes for the sound to travel between elements A and B, (Tx), then the sound or audio received by the microphone is allowed to travel to the output loudspeakers (or other suitable output device) through a suitable gating system designated by reference numeral 13. As an example, assuming elements A and B are located along the center line of the microphone housing with element B rearward from element A and that only sound coming generally from directly in front of the microphone, as illustrated by arrow 14, should turn on the microphone. Then Tx is the time it takes for sound to travel down the microphone axis from element A to element B. Sound entering the microphone at an angle, such as shown by arrow 15, would reach the respective microphone elements A and B at different times but not within the designated time period, Tx. For example, sound coming in at an angle as shown by arrow 15 would first reach element A but would reach element B at a shorter time than it would take for the sound to travel between the two elements if inputted along the line illustrated by arrow 14. This would result in a failure to meet the time differential criteria so that the sound received at the microphone would not pass to the output. As will be explained hereinbelow, when the sound that enters the microphone reaches element A the time period is triggered. Therefore, in the formula (Tb=Ta+Tx) Ta is equal to zero so the critical time period Tb is Tx, the time it takes for the sound to travel from element A to element B.

Referring now to FIG. 2, the output from each of the microphone elements A and B respectively first pass through conventional choke coils 20A and 20B, then through corresponding conventional preamps 21A and 21B and from there in a conventional fashion through respective automatic gain control circuits (AGC) 22A and 22B and then into identical pulse generators 23A and 23B. Pulse generators 23A and 23B are also conventional in nature so they produce at their respective outputs generally square electrical pulses of a prescribed width and fixed amplitude in response to an electrical input signal. The output of pulse generator 23A is applied as an input to shift register 24. Shift register 24 is conventional in nature and will produce a series of output timing pulses from each of the respective stages of the shift register in response to a suitable triggering pulse received at the input. The positive pulse output at 25 selected from one stage of shift register 24 is used to provide an input into gate 26. The other input to gate 26 comes from pulse generator 23B. Gate 26 compares the timing relationship between the two pulses and if they are in synchronization, then gate 26 allows an input at 28 to digital to analog (D-to-A) converter 27 so that the latter will then produce a desired output voltage. If the two pulses at the inputs to gate 26 are not in time synchronization, then no signal appears at input 28 to D-to-A converter 27 so D-to-A converter 27 will not produce a suitable output signal. To further ensure that the microphone is not turned on when the signals from elements A and element B are not in the proper time sequence, gate 30 is provided with an input from the negative side of the stage of shift register 24 at 31 and an input on line 32 from pulse generator 23B. If there is synchronization of those signals, meaning that the negative parts of the pulses not the positive are in agreement, then an output from gate 30 appears on line 34 and is fed into converter 27 to make sure that it does not produce a suitable signal output.

The width of the pulses at the positive output 25 of shift register 24 and the width of the positive pulses coming out of pulse generator 23B are selected so that they will accurately designate sound coming generally from in front of the microphone as being suitable to turn the microphone on; i.e., to allow the audio received at the microphone to appear at and be broadcast by the loudspeaker. But the pulse widths also have some width tolerance so that even if the sound isn't precisely in the front and is somewhat askew or off to the side, it still would result in enough overlap of the pulses to gate 26 to trigger the microphone on. At the same time of course the pulse widths should be selected so that they do not allow too much of a variation so that sound coming from too far afield or at too great an angle will trigger off the gate circuiting and turn on the microphone.

In any event, if there is proper synchronization between the pulses respectively representing the outputs of elements A and elements B, converter 27 will have a suitable amplitude output which appears on line 35 which is fed to a latching circuit designated by reference numeral 36. The latching circuit is of a conventional nature and its sole purpose is to make sure that the microphone is not turned on due to a sporadic or transient signal. The output from latch circuit 36 is then fed to a conventional delay circuit designated by reference numeral 37 which in turn feeds a signal to gate 38 which gates the audio input to a suitable output, such as loudspeakers. The audio input to gate 38 can be from either element A or element B contained in the microphone. Delay circuit 37 is conventional and its sole purpose is to make sure that the microphone is turned on or remains turned on during very brief or short pauses that may occur while the user is talking into the microphone.

Figure 3B:
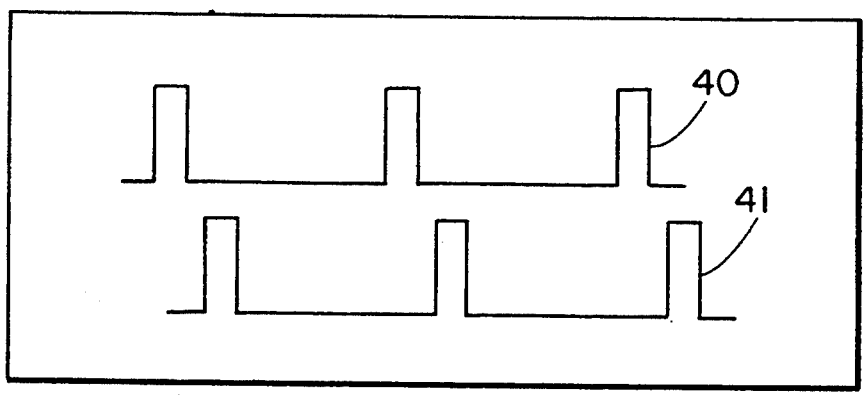

FIG. 3A illustrates the synchronization of the pulses from the positive output 25 of shift register 24, designated by reference numeral 40, with the output of the pulses from pulse generator 23B, designated by reference numeral 41. As illustrated in FIG. 3A, a positive pulse 40 at positive output 25 of shift register 24 enables gate 26 to allow a time synchronized positive pulse 41 from pulse generator 23B appearing on line 33 to provide an input at 28 to the D-to A converter 27 resulting in the audio input received at the microphone to be gated to the output loudspeakers. As illustrated in FIG. 3 B, the absence of synchronization between pulses 40 and 41 results in no signal input appearing at input 28 to the converter 27. At the same time, there is synchronization of the lower half or what is designated as the negative portion of the pulses which result in a gating of or an enabling of gate 30 to provide a signal input at 34 to the converter 27 to provide further insurance that the audio input will not be gated out to the loudspeakers.

I claim:

1. In an audio sound system having multiple microphones feeding into a loudspeaker, a method for distinguishing between sources of sound coming to a single microphone, said method comprising the steps of:
a) placing a pair of non-directional microphone elements in spaced-apart relationship within a single microphone;
b) triggering a timing device with the output of one of said microphone elements to produce a prescribed time signal;
c) then comparing the time of occurrence of the output from the other microphone element to the timing device prescribed time signal; and
d) then blocking the sound received at the microphone from reaching the loudspeaker when the output of the other microphone element occurs outside the prescribed time signal.

2. In an audio sound system having a microphone, an amplifier for amplifying the sound received by the microphone and an audio system output for broadcasting the amplified sound received by the microphone, the improvement comprising:
a) first and second non-directional microphone elements displaced from one another within a single microphone, each of said elements producing a microphone output signal in response to the sound received by the microphone;
b) timing means triggered by a microphone output signal of one of said microphone elements;
c) said timing means producing a timing means output signal at a prescribed time after being triggered;
d) gating means having said timing means output signal as a first input and the microphone output signal from the other of said microphone elements as a second input for controlling the passage of the sound received by the single microphone to the audio system output.

* * * * *